Figure 1:
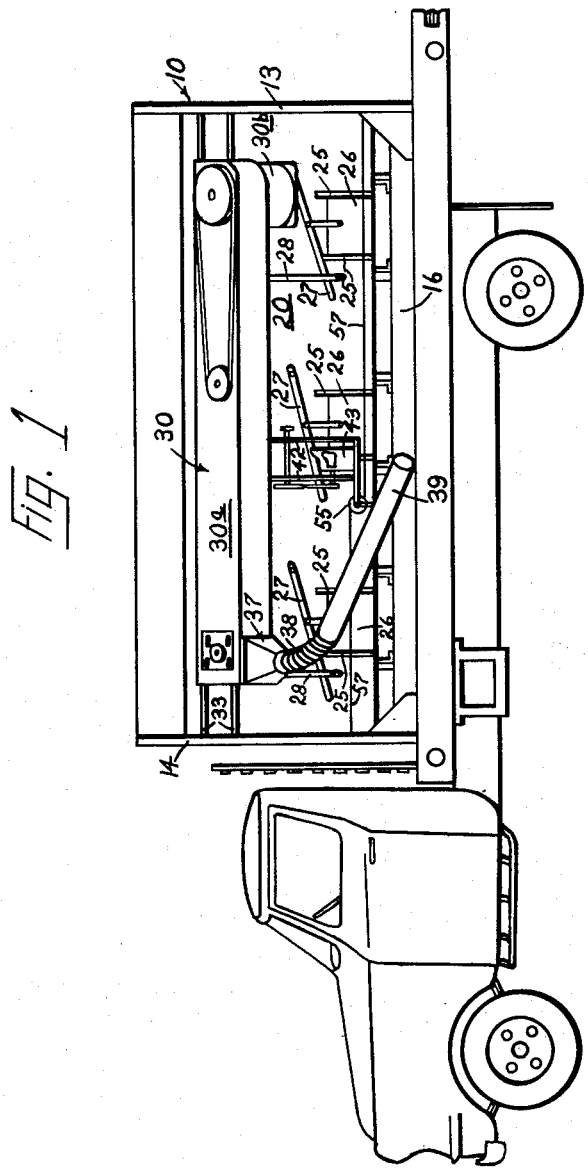

INVENTORS.
JAMES R. BARBER
JESSE BARBER
BY Wells & St. John
ATTYS.

April 20, 1965   J. R. BARBER ETAL   3,179,273
TRANSPORT BOX AND UNLOADING CONVEYOR FOR GRANULAR MATERIALS
Filed May 17, 1963   7 Sheets-Sheet 5

INVENTORS.
JAMES R. BARBER
JESSE BARBER
BY Wells & St John
ATTYS.

April 20, 1965 J. R. BARBER ETAL 3,179,273
TRANSPORT BOX AND UNLOADING CONVEYOR FOR GRANULAR MATERIALS
Filed May 17, 1963 7 Sheets-Sheet 6
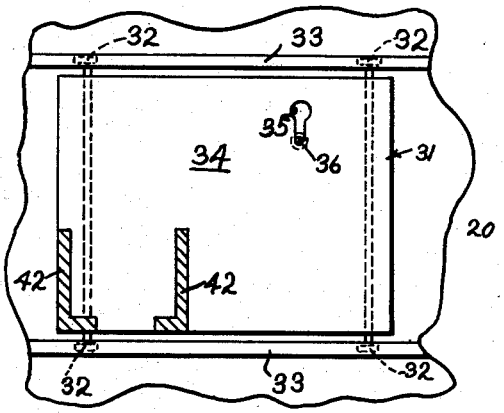
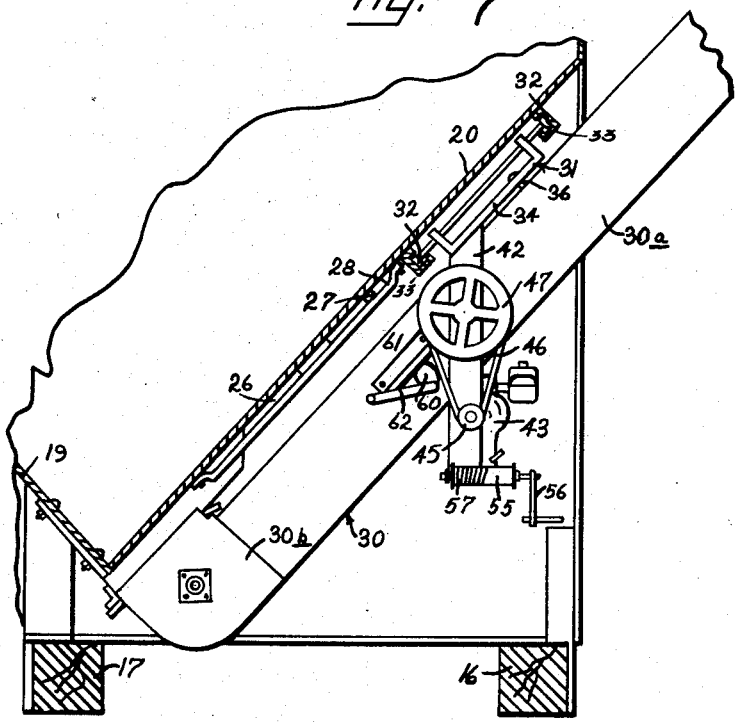
INVENTORS.
JAMES R. BARBER
JESSE BARBER
BY Wells & St. John
ATTYS.

April 20, 1965     J. R. BARBER ETAL     3,179,273
TRANSPORT BOX AND UNLOADING CONVEYOR FOR GRANULAR MATERIALS
Filed May 17, 1963

INVENTORS.
JAMES R. BARBER
JESSE BARBER
BY Wills & St John
ATTYS.

United States Patent Office 3,179,273
Patented Apr. 20, 1965

3,179,273
TRANSPORT BOX AND UNLOADING CONVEYOR FOR GRANULAR MATERIALS
James R. Barber and Jesse Barber, both % Barber Engineering, E. 1407 Sprague Ave., Spokane, Wash.
Filed May 17, 1963, Ser. No. 281,160
2 Claims. (Cl. 214—522)

This invention relates to a transport box and unloading conveyor for granular materials. On many of the modern farms today it is desirable to have a device which can take a truck load of granular material, such as seed grain or granular fertilizer, to the seeding device or fertilizer distributor and load the material from the truck into the individual hoppers of a plurality of distributors which may be hitched together end to end and drawn by a single powered vehicle. It is also desirable that this device be of such a nature as to fit upon a flat bed truck that is available on the farm and be so constructed that the unloading device for the transport box, which usually embodies an elevator conveyor, can be folded so as to be extended longitudinally of the transport box and within the confines thereof in order not to produce any difficulties in travel along a highway.

It is the purpose of our invention to provide a transport box and unloading conveyor of this nature which comprises an elongated hopper having a plurality of aligned outlets with the individual gates to service such outlets, in combination with a carriage that is movably suspended from the box to travel parallel to the aligned outlets and a conveying and elevating tube swiveled on the carriage for movement between a horizontal position and an upwardly inclined position in which the lower end is in register with one of the seed outlets together with power driven conveyor means in the tube to transport the contents of the hopper up through the tube for dischrage to the hoppers of the distributing device.

Our invention contemplates a device of this character wherein the elongated hopper is carried by two end frames and a plurality of skids beneath the end frames and connecting them. The hopper has inclined sides and has an interior construction that directs the contents thereof down to a plurality of outlets which are provided at the bottom of one of the inclined sides of the hopper so that the several outlets are spaced lengthwise of the hopper and aligned with the bottom of each of the hoppers. Adjacent the top of one of the inclined bottom walls of the hopper a trackway is provided to carry a mounting plate to which an elevator conveyor is swiveled or pivoted so that it can swing into a horizontal position parallel to the trackway or in an inclined position where the lower end of the conveyor is positioned in alignment with one of the outlet openings and the upper end projects upwardly and outwardly from the hopper. The discharge end of the conveyor unit preferably is provided with a flexible tubular spout which in turn has an elongated filling tube made of a plurality of sections that telescope one into the other.

The nature and advantages of our invention will appear more fully from the following detailed description and the accompanying drawings in which a preferred form of the invention is shown. The description and drawings are intended to be illustrative only and are not intended to limit the invention except insofar as it is limited by the claims.

Figure 2:
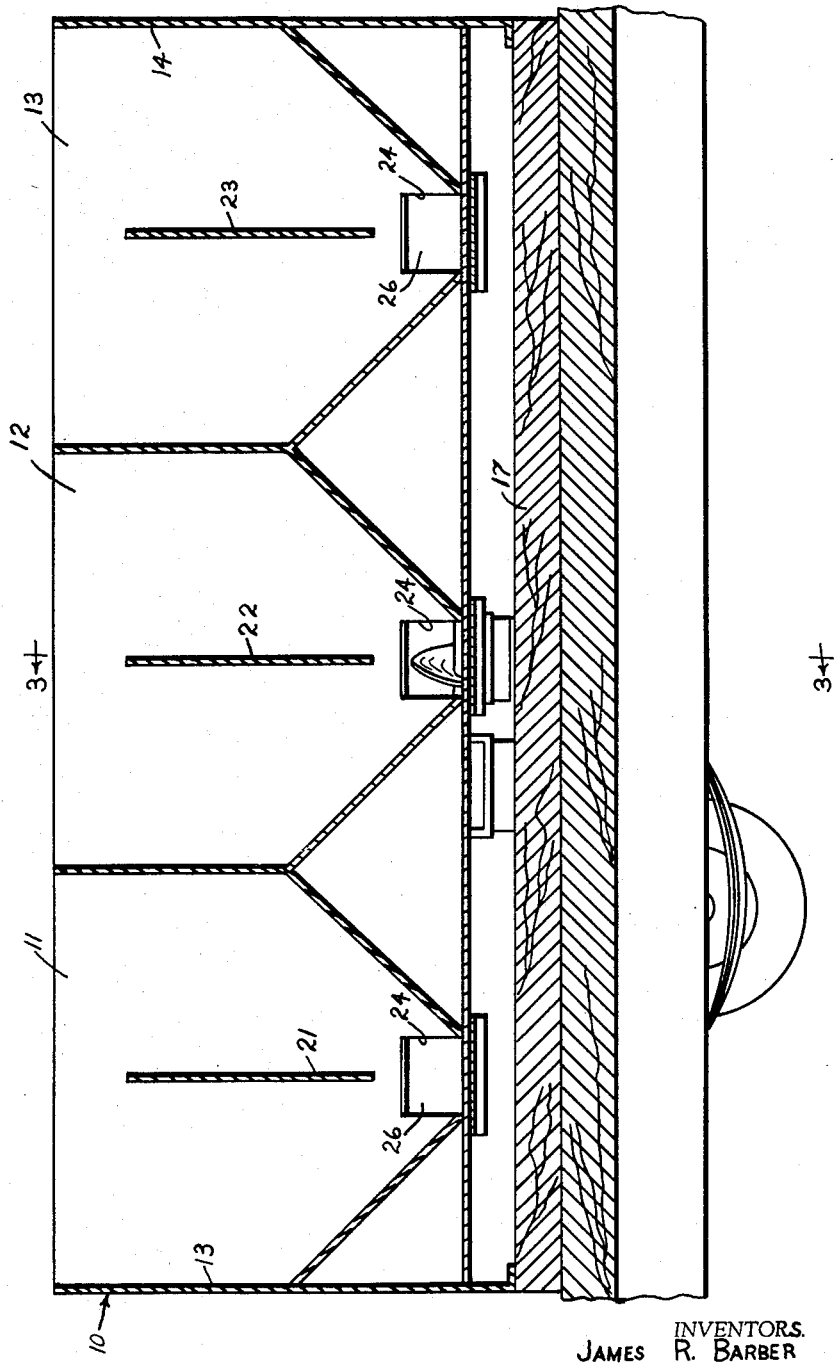
Figure 3:
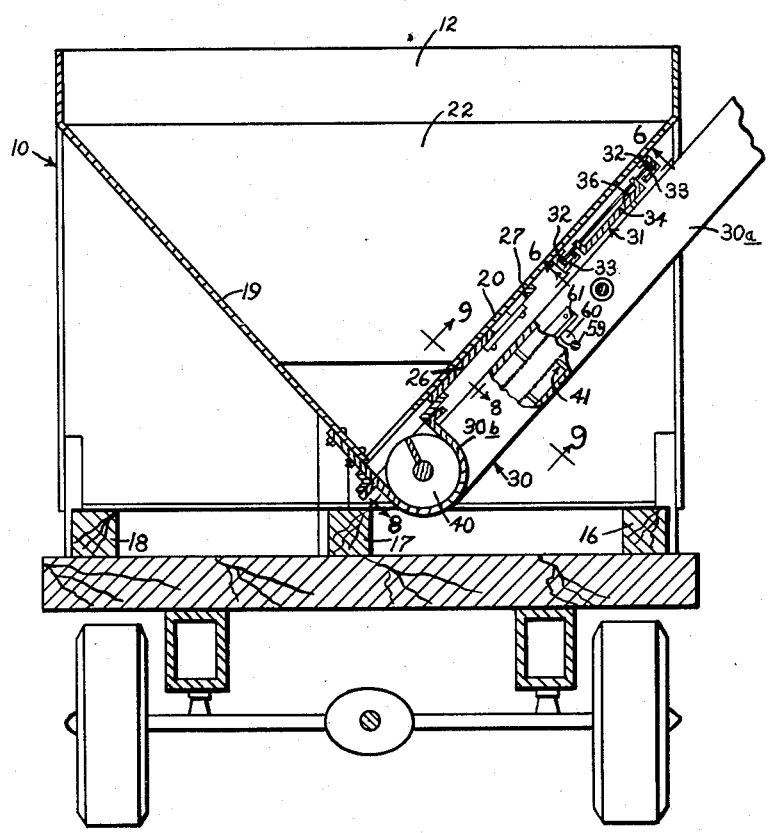
Figure 4:
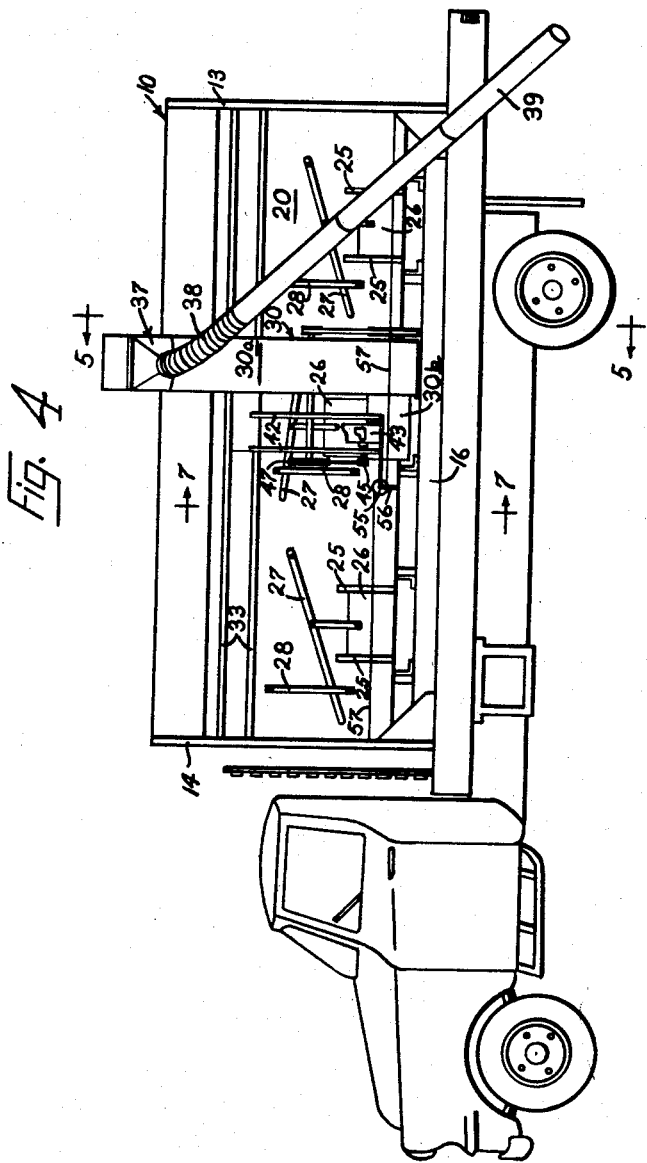
Figure 5:
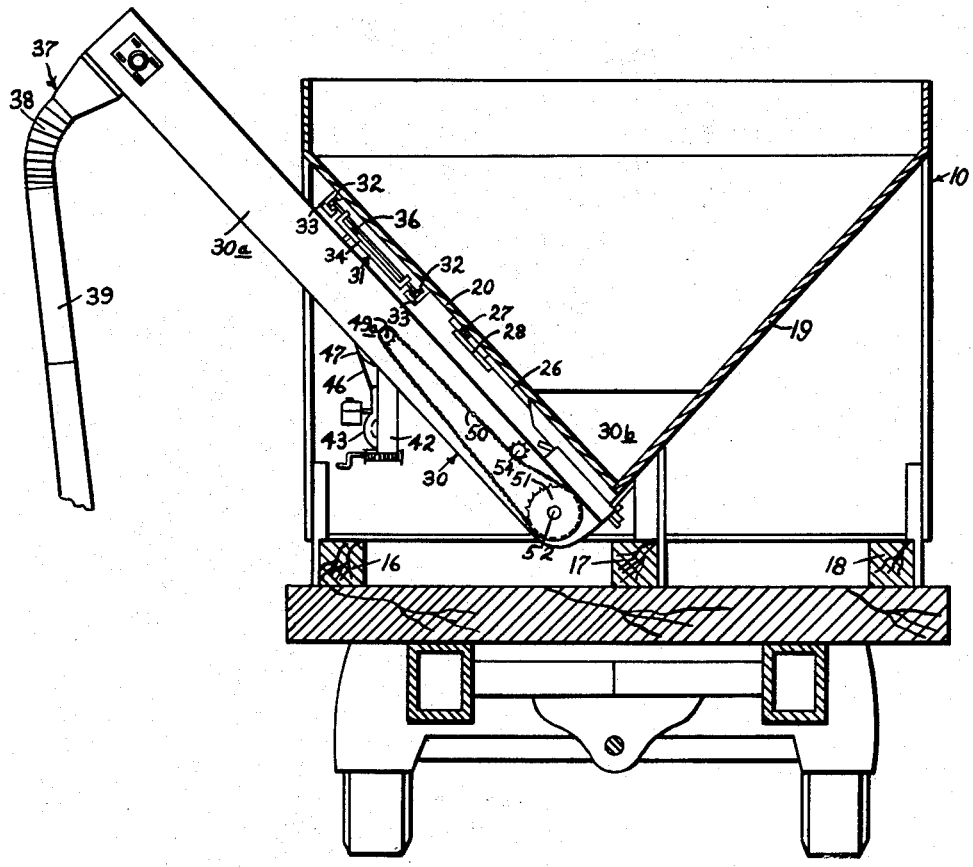
Figure 8:
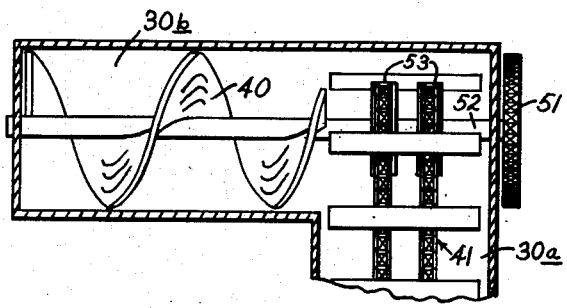
Figure 9:
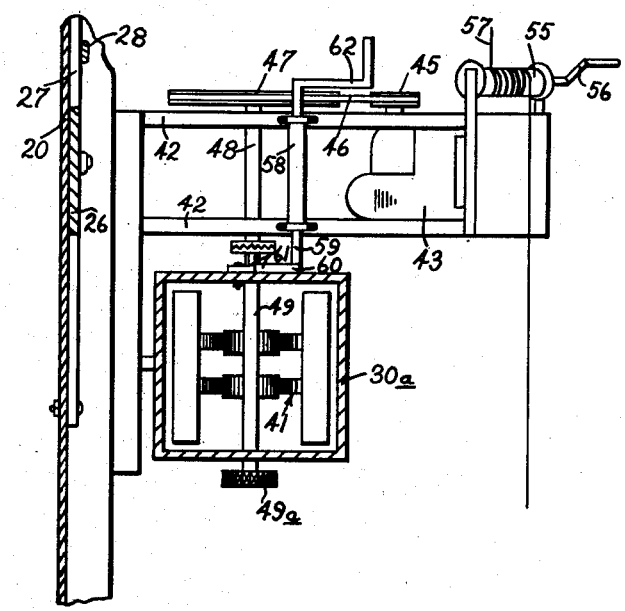

In the drawings:
FIGURE 1 is a view in side elevation of a truck bed and our improved transport box and unloading conveyor thereon;
FIGURE 2 is a longitudinal sectional view taken through the transport box showing the interior construction of the hopper;
FIGURE 3 is a sectional view taken on the line 3—3 of FIGURE 2;
FIGURE 4 is a side view similar to FIGURE 1, but showing the parts in position for delivery of the contents to the hopper;
FIGURE 5 is a sectional view taken substantially on the line 5—5 of FIGURE 4;
FIGURE 6 is an enlarged sectional view taken along line 6—6 in FIGURE 3, illustrating the manner of mounting the elevator conveyor to the hopper;
FIGURE 7 is an enlarged fragmentary sectional view taken along line 7—7 in FIGURE 4;
FIGURE 8 is an enlarged sectional view taken substantially on the line 8—8 of FIGURE 3; and
FIGURE 9 is a fragmentary sectional view taken on the line 9—9 of FIGURE 3 with certain parts being left out for the sake of clarity.

The transport box of our invention is illustrated as a hopper 10 which is so constructed as to embody essentially three separate compartments 11, 12 and 13. Rectangular end plates 14 and 15 form the ends of the hopper. These plates extend down and are fixed to a plurality of skids 16, 17 and 18. The skids may be desirably made of wood and they are adapted to rest on a truck bed as illustrated in FIGURE 1. The hopper itself has two inclined bottom walls 19 and 20 extending between the plates 14 and 15 and joined thereto. Inside the hopper there are suitable cross members 21, 22 and 23 that aid in producing a rigid construction with inclined walls that lead down to parallel outlets 24 that are spaced along the bottom of the hopper in the wall 20. These rectangular outlets 24 are aligned and each lies at the bottom of the compartments 11, 12 or 13.

Each outlet 24 has a rectangular frame 25 around it and this frame is so constructed as to receive a sliding gate 26 by which the outlet can be closed, the gate being operated by a lever 27 which has one end pivoted on the wall 20, the other end being guided by a bracket 28 that is fastened to the wall 20. It is evident that by opening the gate 26 of any one of the outlets 24 the contents of the compartment above the outlet will flow out through the outlet.

In order to elevate and distribute the material from the outlets 24 we provide a tubular conveyor 30 and connect it to the hopper 10 in such a fashion that it is suspended from the hopper and the tube swings into an inclined position where it is parallel to the walls 12 of the hopper with its lower end positioned to engage the frame 25 around an outlet 24, and the upper end projecting outwardly and upwardly from the hopper. The conveyor 30 is mounted upon a carriage 31 which is mounted by wheels 32 on tracks 33 for movement endwise of the hopper to bring the conveyor 30 into alignment with any one of the outlets 24. The conveyor is loosely pivoted on the carriage 31 in a simple manner. The carriage 31 has a bottom plate 34 which has a keyhole slot 35 therein. The conveyor tube 30 has intermediate its ends a headed projection 36 which can be passed through the keyhole slot 35 and lowered so as to ride on the plate 34 and yet be free to pivot from its inclined position to the horizontal position illustrated in FIGURE 1. When horizontal, conveyor 30 is fastened relative to wall 20 by a conventional latch mechanism.

The tubular conveyor 30 as shown, is provided with an elongated portion 30a which carries the projection 36 and which at its upper end carries the down spout 37 having flexible tubular portion 38 which terminates in a metallic portion 39 that is made up of three telescoping sections. FIGURE 1 shows the three telescoping sections slid together to shorten them, and FIGURE 4 shows the sections extended so that they can reach out to the hoppers of a distributing device such as a seed drill or fertilizer spreader.

At its lower end the conveyor 30 has a laterally extending section 30b which is the section that has an opening at the top adapted to receive the frames 25 of the outlet 24. In the section 30b we provide a screw conveyor 40 which feeds the granular material into the section 30a. The section 30a of the conveyor 30 is shown as provided with a known chain and paddle type of conveyor 41 that will move the granular material up to the upper end of the section 30a and discharge it into the spout 37. It is obvious that any suitable type of conveyor may be used in the section 30a for elevating the material. However, it is necessary that the conveyor 40 and the section 30b of the conveyor 30 be of such a nature that when the conveyors are not running these parts 40 and 30b effectively prevent overflow of granular material and control the rate at which the granular material will be moved away from the outlet 40 so as to prevent plugging the inclined portion 30a. This is more easily accomplished by using a screw conveyor in the portion 30b and drivingly connecting it to the elevating conveyor 41 so that the feed by the conveyor 40 will always be proportional to the travel of the elevating conveyor 41.

The drive for the conveyors comprises a motor mounting frame 42 that is suspended from the carriage 31 alongside the conveyor 30 and downward from the pivotal mounting 35–36 of the conveyor 30 on the carriage so as not to interfere with the conveyor 30 in its horizontal position above this pivotal connection. The motor mounting 42 carries an internal combustion engine 43 and a drive pulley 45 driven by the engine 43. The pulley 45 drives a belt 46 which in turn drives a larger pulley 47. This pulley has its shaft 48 releasably coupled to a shaft 49 that extends through the shell of the conveyor 30 and is journalled therein. On the other side of the shell of the conveyor 30 the shaft 48 has a sprocket 49a thereon which drives a chain 50 which in turn drives a sprocket 51 that is on the shaft 52 of the screw conveyor 40. This shaft 52 is also the drive shaft for the chains of the conveyor 41 having suitable sprockets 53 thereon for this purpose. A tightener for the sprocket chain is shown at 54.

In order to move the mechanism just described including the carriage 31 lengthwise of the hopper 10, the motor mounting 42 carries a drum 55 which has a hand crank 56 for turning it. A cable 57 is wound around the drum 55 several times and has its ends connected to the end frames 14 and 15 of the hopper.

It will be appreciated that the pivotal connection at 35–36 between the carriage 31 and the conveyor 30 is a relatively loose connection. It is therefore necessary in order to effect a seal tight enough to prevent leakage of granular particles to provide some means of moving the conveyor portions 30b up tightly against the frame 25 of the outlet 24. In order to do this we mount on the motor mounting frame 42 a sleeve 58 which carries a cam shaft 59 having a pair of cams 60 positioned to move up against flanges 61 provided on the conveyor casing 30 so as to press upwardly on this casing and thus move the portion 30b into sealing engagement with the frame 25 prior to the opening of the associated gate 26. A hand crank 62 is used to turn the cam 60.

It is believed that the nature and advantage of our invention will be clear from the foregoing description. The device described provides a transport box having ample capacity with an unloading conveyor which can be moved to any one of a plurality of outlets at the bottom of the transport box and there operated to elevate the granulated material at a controlled rate for distribution to several seed or fertilizer spreaders while the truck that carries the transport box is in one position. The construction is such that the elevating and unloading apparatus is safely housed within the outline of the transport box when it is not in use. The whole transport box can be placed upon or removed from a flat bed truck as a unit by simply jacking it up upon suitable supports while the truck is jacked beneath it or removed from it.

Having thus described our invention, we claim:

1. In a transport box and unloading conveyor for granular materials:

a box including a plurality of hopper sections having sloping side walls, each section having a bottom outlet located adjacent to the bottom edge of one side wall of each respective section and normally closed by an individually operable gate;

means mounted on said box adapted to selectively open individual outlets by moving said gates;

a supporting carriage mounted on said box above said outlets for longitudinal motion relative thereto along the length of said side walls;

a conveying and elevating device pivotally mounted on said carriage for motion between a generally horizontal storage position adjacent to said one side wall of said hoppers and an upright working position also adjacent to said one side wall of the hopper, said device including an auger conveyor mechanism having an inlet adapted to be positioned in sealed communication with an individual outlet when said device is in its upright position, and further including an elevating conveyor operatively connected to the discharge end of said auger conveyor mechanism;

locking means on said carriage, box and device to selectively fix the position of said carriage and device relative to said box prior to and during delivery of granular materials from an outlet by urging said device toward said one side wall of the hopper to be unloaded;

and power means connected to said auger conveyor mechanism and said elevating conveyor.

2. In a transport box and unloading conveyor for granular materials:

a box including a plurality of hopper sections having sloping side walls, each section having a bottom outlet located adjacent to the bottom edge of one side wall;

a rectangular exterior frame fixed to said box about each of said outlets;

individual gates slidably mounted in said frames adapted to be selectively positioned so as to open and close said outlets;

means mounted on said box operatively engaged with said gates adapted to individually position said gates in said frames;

a supporting carriage and framework fixed thereto mounted on said box above said outlets for longitudinal motion relative to the box along the length of said one side wall of each of said hoppers;

a conveying and elevating device pivotally mounted on said carriage for motion between a generally horizontal storage position adjacent to said one side wall of said hoppers and an upright working position also adjacent to said one side wall of a hopper, said device including an auger conveyor mechanism having an inlet adapted to be positioned in sealed communication with the frame about an individual outlet when said device is in its upright position, and an elevating conveyor operatively connected to the discharge end of said auger conveyor mechanism;

locking means on said carriage, box and device to selectively fix the position of said carriage and device relative to said box prior to and during delivery of granular materials from an outlet by urging said device toward said one side wall of the hopper being unloaded;

and power means connected to said auger conveyor mechanism and said elevating conveyor.

References Cited by the Examiner

UNITED STATES PATENTS

| | | |
|---|---|---|
| 922,390 | 5/09 | Chalfant. |
| 2,139,417 | 12/38 | Milan. |
| 2,503,129 | 4/50 | Pautz _____ 214—520 |
| 2,564,020 | 8/51 | Mengel. |
| 2,609,115 | 9/52 | Oklejas _____ 214—83.26 X |
| 3,081,862 | 3/63 | Knoedler _____ 214—83.26 X |

FOREIGN PATENTS 915,027 9/60 Great Britain.

HUGO O. SCHULZ, *Primary Examiner.*

GERALD M. FORLENZA, *Examiner.*